(12) United States Patent
Hamamoto et al.

(10) Patent No.: US 7,537,392 B2
(45) Date of Patent: May 26, 2009

(54) ROLLING BEARING

(75) Inventors: Magozou Hamamoto, Kanagawa (JP); Toshihisa Ohata, Kanagawa (JP); Koichi Goto, Kanagawa (JP); Toshimi Takajo, Kanagawa (JP)

(73) Assignee: NSK Ltd., Tokyo (JP)

( * ) Notice: Subject to any disclaimer, the term of this patent is extended or adjusted under 35 U.S.C. 154(b) by 401 days.

(21) Appl. No.: 11/059,445

(22) Filed: Feb. 17, 2005

(65) Prior Publication Data
US 2005/0169565 A1 Aug. 4, 2005

Related U.S. Application Data

(62) Division of application No. 09/898,495, filed on Jul. 5, 2001, now Pat. No. 6,926,447.

(30) Foreign Application Priority Data

Jul. 5, 2000 (JP) .................. P. 2000-203941
Jul. 5, 2001 (JP) .................. P. 2001-204853

(51) Int. Cl.
*F16C 33/56* (2006.01)

(52) U.S. Cl. .................................... 384/527

(58) Field of Classification Search ................ 384/523, 384/527; 428/411.1, 435, 474.4, 475.5; 524/492–496, 524/606, 609, 540
See application file for complete search history.

(56) References Cited

U.S. PATENT DOCUMENTS

| 3,962,524 A | 6/1976 | Miyamoto et al. |
| 4,532,275 A | 7/1985 | Aito et al. |
| 4,554,320 A | 11/1985 | Reimann et al. |
| 4,877,813 A | 10/1989 | Jinno et al. |
| 4,952,354 A | 8/1990 | Yokoi et al. |
| 5,238,990 A | 8/1993 | Yu et al. |
| 5,304,422 A | 4/1994 | Tanabe et al. |
| 5,371,132 A | 12/1994 | Ebara et al. |
| 5,375,933 A | 12/1994 | Mizutani et al. |
| 5,554,677 A | 9/1996 | Nagaoka et al. |
| 5,590,225 A | 12/1996 | Aramaki et al. |
| 5,731,373 A | 3/1998 | Hirose et al. |

(Continued)

FOREIGN PATENT DOCUMENTS

JP 5-271678 A 10/1993

(Continued)

OTHER PUBLICATIONS

Actech Inc., Thermoplastic Material Selection Guide, May 23, 1998.

(Continued)

*Primary Examiner*—Thomas R Hannon
(74) *Attorney, Agent, or Firm*—Sughrue Mion, PLLC

(57) ABSTRACT

The present invention provides a rolling bearing which comprises a retainer that can be used without any deformation at high temperatures and fairly assembled to bearing and thus can be used under severe working conditions such as high temperature, high rotary speed and high load over an extended period of time. A novel rolling bearing is provided comprising a retainer made of a resin composition having a flexural modulus of at least 3,500 MPa at 180° C. and a heat-resistant temperature of at least 150° C.

2 Claims, 14 Drawing Sheets

U.S. PATENT DOCUMENTS

| | | |
|---|---|---|
| 5,731,375 A | 3/1998 | Park et al. |
| 5,792,527 A | 8/1998 | Yoshimitsu et al. |
| 5,807,920 A | 9/1998 | Ueno et al. |
| 5,851,474 A | 12/1998 | Allan et al. |
| 5,917,164 A | 6/1999 | Sasaki |
| 6,048,922 A | 4/2000 | Brink et al. |
| 6,103,806 A | 8/2000 | Kido et al. |
| 6,194,524 B1 | 2/2001 | Nagashima et al. |
| 6,315,456 B1 | 11/2001 | Tanimoto et al. |

FOREIGN PATENT DOCUMENTS

| | | |
|---|---|---|
| JP | 8-145061 A | 6/1996 |
| JP | 11-108063 A | 4/1999 |
| JP | 2000-161365 A | 6/2000 |
| JP | 2000-227120 | 8/2000 |

OTHER PUBLICATIONS

Purecoat International, LLC, 2000.

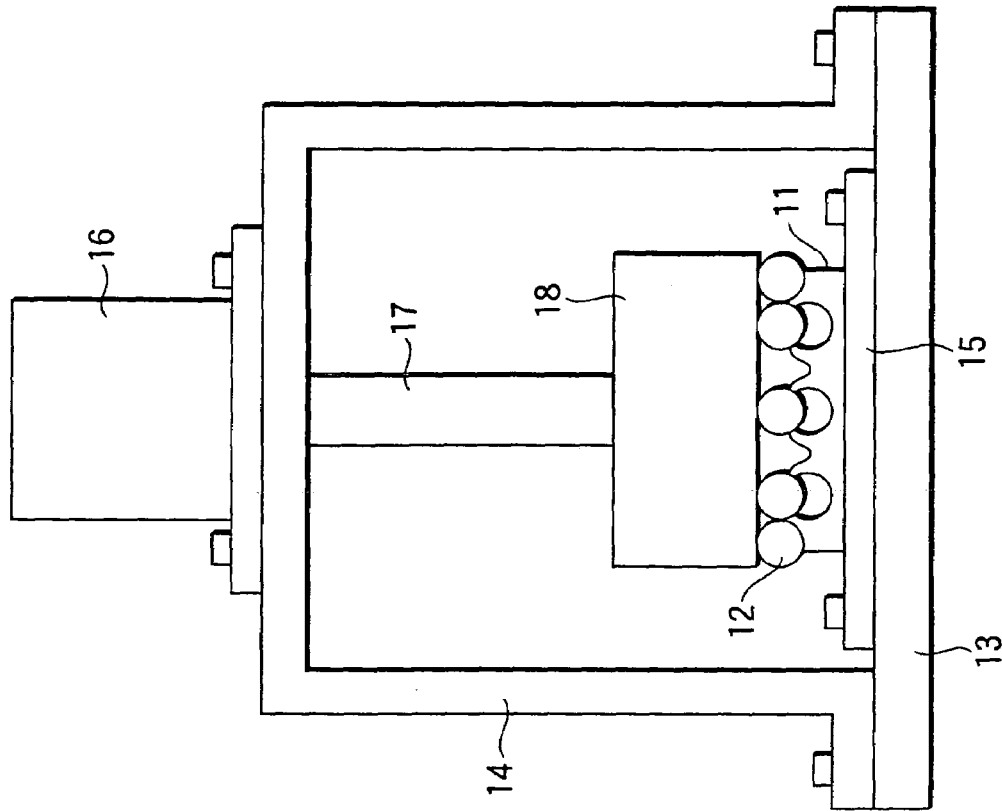
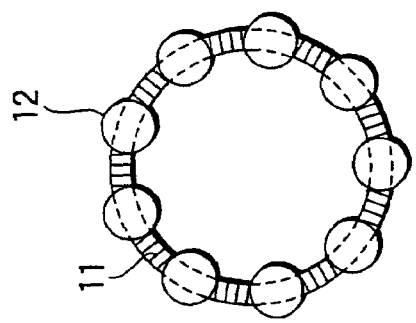

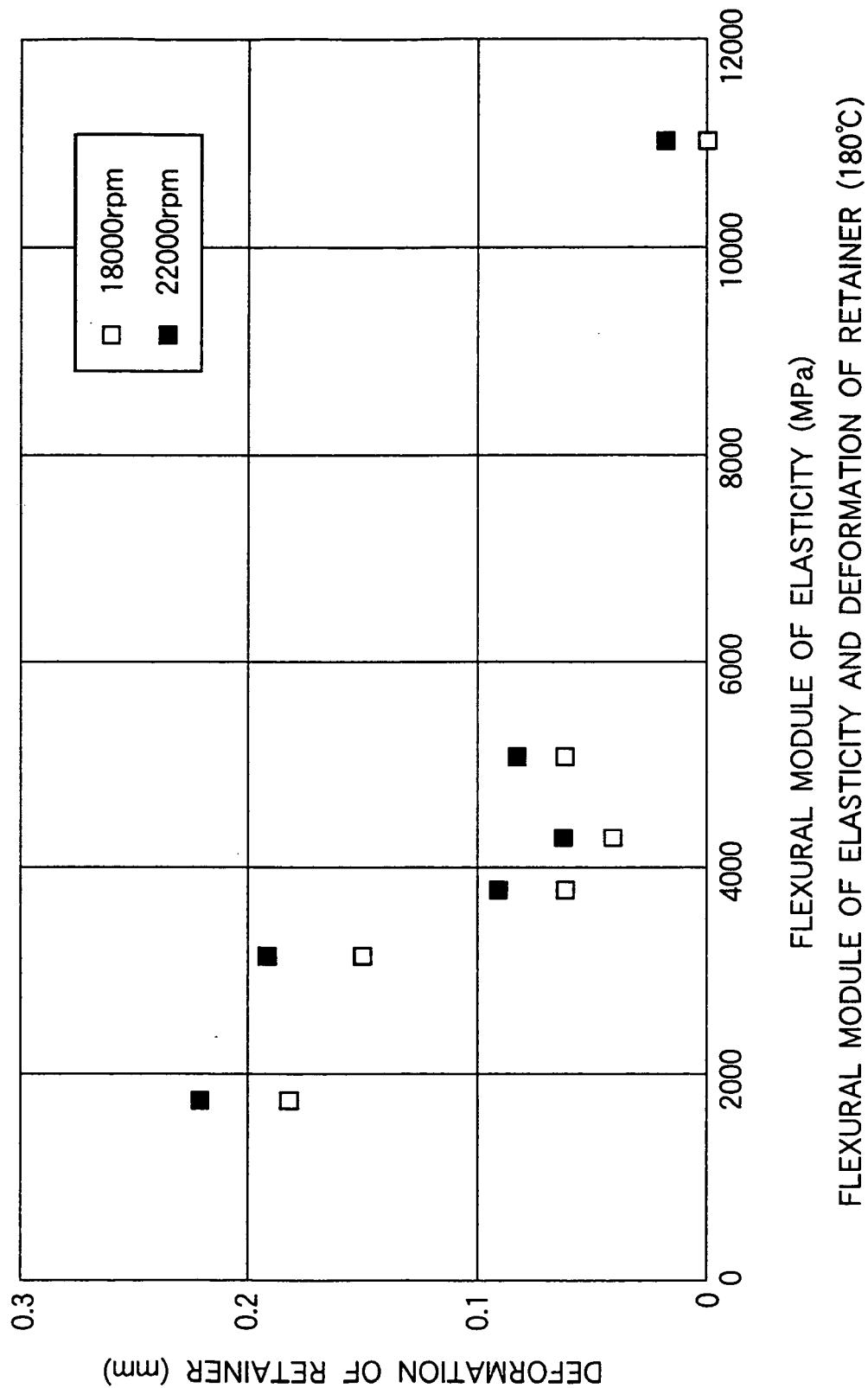

HEAT RESISTANCE OF RETAINER (170°C)

HEAT RESISTANCE OF RETAINER (150°C)

US 7,537,392 B2

ROLLING BEARING

This is a divisional of application Ser. No. 09/898,495 filed Jul. 5, 2001 now U.S. Pat. No. 6,926,447.

BACKGROUND OF THE INVENTION

The present invention relates to a rolling bearing for devices that are required to operate at a high temperature and a high velocity such as automobile alternator. More particularly, the present invention relates to a rolling bearing comprising a retainer having a heat resistance, oil resistance and high-velocity durability.

In general, rolling bearings can be divided into two groups, i.e., ball bearing and roller bearing, by the kind of rolling element to be incorporated therein. These ball bearings and roller bearings can be divided into several kinds by their shape and purpose. Accordingly, there are various kinds of retainers for use in these bearings.

In general, a ball bearing is often provided with a crown retainer 6 shown in FIG. 1. For example, a rolling bearing having the crown retainer shown in FIG. 1 mounted thereon comprises an inner ring 2 having a raceway 1 on the periphery thereof, an outer ring 4 having a raceway 3 on the inner surface thereof, a plurality of rolling elements 5 provided interposed between the inner ring 2 and the outer ring 4, and a crown retainer 6 provided rotatably between the inner ring raceway 1 and the outer ring raceway 3 for supporting and guiding the plurality of rolling elements 5, as shown in FIG. 2.

Examples of this type of a retainer include metallic retainer, and plastic retainer. As the material constituting the plastic retainer there has heretofore been used a so-called engineering plastic such as polyamide, polyacetal, polybutylene terephthalate and fluororesin, singly or in composite form obtained by reinforcing with a short fiber such as glass fiber and carbon fiber. Among these materials, polyamide has well-balanced material cost and performance and thus has been widely used as a material constituting the plastic retainer. It has been confirmed that plastic retainers made of polyamide exhibits an excellent performance.

However, polyamide 6 (nylon 6) and polyamide 66 (nylon 66), which have heretofore been commonly used as polyamide, are disadvantageous in that they are subject to deterioration with time under continuous working conditions at an ambient temperature of not lower than 120° C. or under conditions such that they come into continuous or intermittent contact with oils such as extreme pressure additive and additive oil and thus cannot satisfy the requirements of the market.

In recent years, improvements for energy saving have been under way in automobile industry. For example, it has been heretofore usual that alternators are air-cooled by cooling fan in operation. However, the trend is for more alternators to be water-cooled for the purpose of enhancing efficiency. Under these circumstances, the rolling bearings for use in these alternators have been more subject to high temperature than every and thus have been required to withstand higher temperatures.

Further, when used under working conditions such as high temperature and high rotary speed (e.g., 20,000 rpm), retainers made of conventional polyamides exhibit an insufficient heat resistance and insufficient high temperature strength and rigidity that cause deformation during rotation, resulting in contact with the outer ring of the bearing and hence abrasion on the retainer or seizing on the bearing. This, too, makes it impossible for these retainers to satisfy the requirements of the market.

Under these circumstances, as a material constituting the plastic retainer to be used at an ambient temperature as high as higher than 150° C. there has recently been proposed a so-called superengineering plastic resin such as polyether sulfone (PES), polyetherimide (PEI), polyamidimide (PAI) and polyimide (PI).

However, despite their excellence in heat resistance and chemical resistance, these proposed materials are disadvantageous in that they leave something to be desired in flexibility necessary for retainer, making it difficult for the resulting retainer to be assembled into bearing. Accordingly, these materials have never been widely used.

SUMMARY OF THE INVENTION

The present invention has been worked out to solve these problems with the foregoing rolling bearing comprising such a conventional plastic retainer. An object of the invention is to provide a rolling bearing which comprises a retainer that can be used without any deformation at high temperatures and fairly assembled to bearing and thus can be used under severe working conditions such-as high temperature, high rotary speed and high load over an extended period of time.

The foregoing object of the present invention will become apparent from the following detailed description and examples.

The foregoing object of the invention is accomplished with rolling bearing comprising:

inner and outer members rotatable relative to each other;

a plurality of rolling elements rotatably interposed between the inner and outer members; and a retainer rotatably holding the rolling elements, wherein the retainer is made of a resin composition having a flexural modulus of at least 3,500 MPa at 180° C. and a heat-resistant temperature of at least 150° C.

Note that the term "heat-resistant temperature" as used herein is meant to indicate the temperature at which the retainer can be allowed to stand for 1,000 hours with its tensile strength drop kept within 10%.

The retainer to be used in the rolling bearing of the invention is produced from a resin composition having a flexural modulus of at least 3,500 MPa at 180° C. and a heat-resistant temperature of at least 150° C. and thus exhibits an excellent heat resistance and oil resistance as well as good mechanical properties. This material has a proper flexibility and hence a snap-fit property required for retainer. The resulting retainer can be fairly assembled to bearing. Accordingly, the rolling bearing of the invention comprising such a retainer can be used under severe working conditions such as high temperature, high rotary speed and high load over an extended period of time and thus is suitable for automobile alternator for example.

BRIEF DESCRIPTION OF THE DRAWINGS

By way of example and to make the description more clear, reference is made to the accompanying drawings in which:

FIG. 3 is a diagram illustrating a crown retainer mounting test wherein FIG. 3a is a plan view of a retainer and FIG. 3b is a schematic view of the testing apparatus;

FIG. 5 is a graph illustrating the relationship between the deformation and flexural modulus of elasticity of a retainer on bearing rotary test at 180° C.;

DETAILED DESCRIPTION OF THE INVENTION

Figure 1:
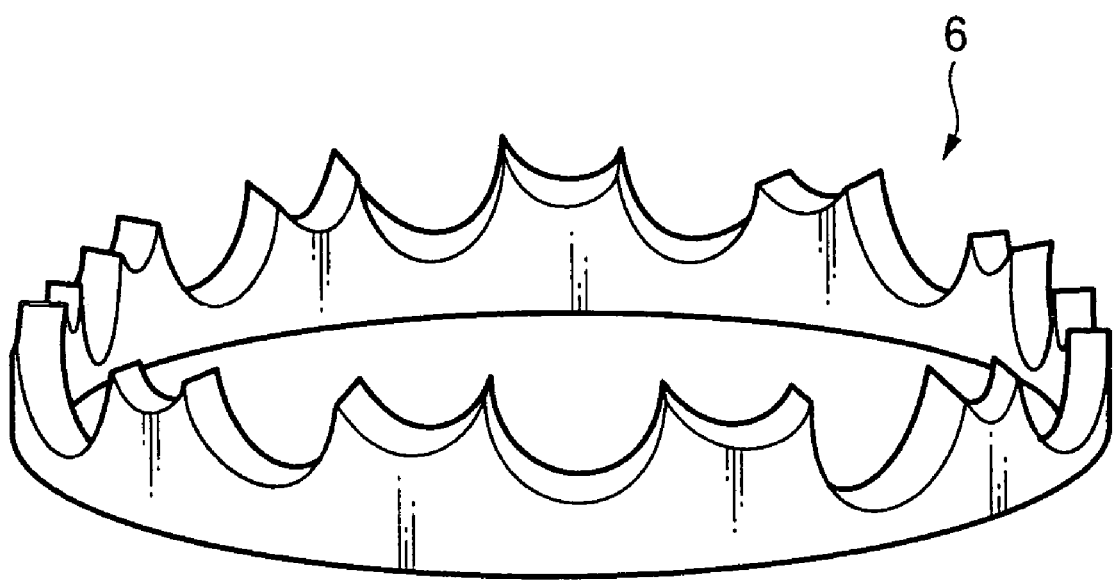
FIG. 1 is a perspective view of a crown retainer.
Figure 2:
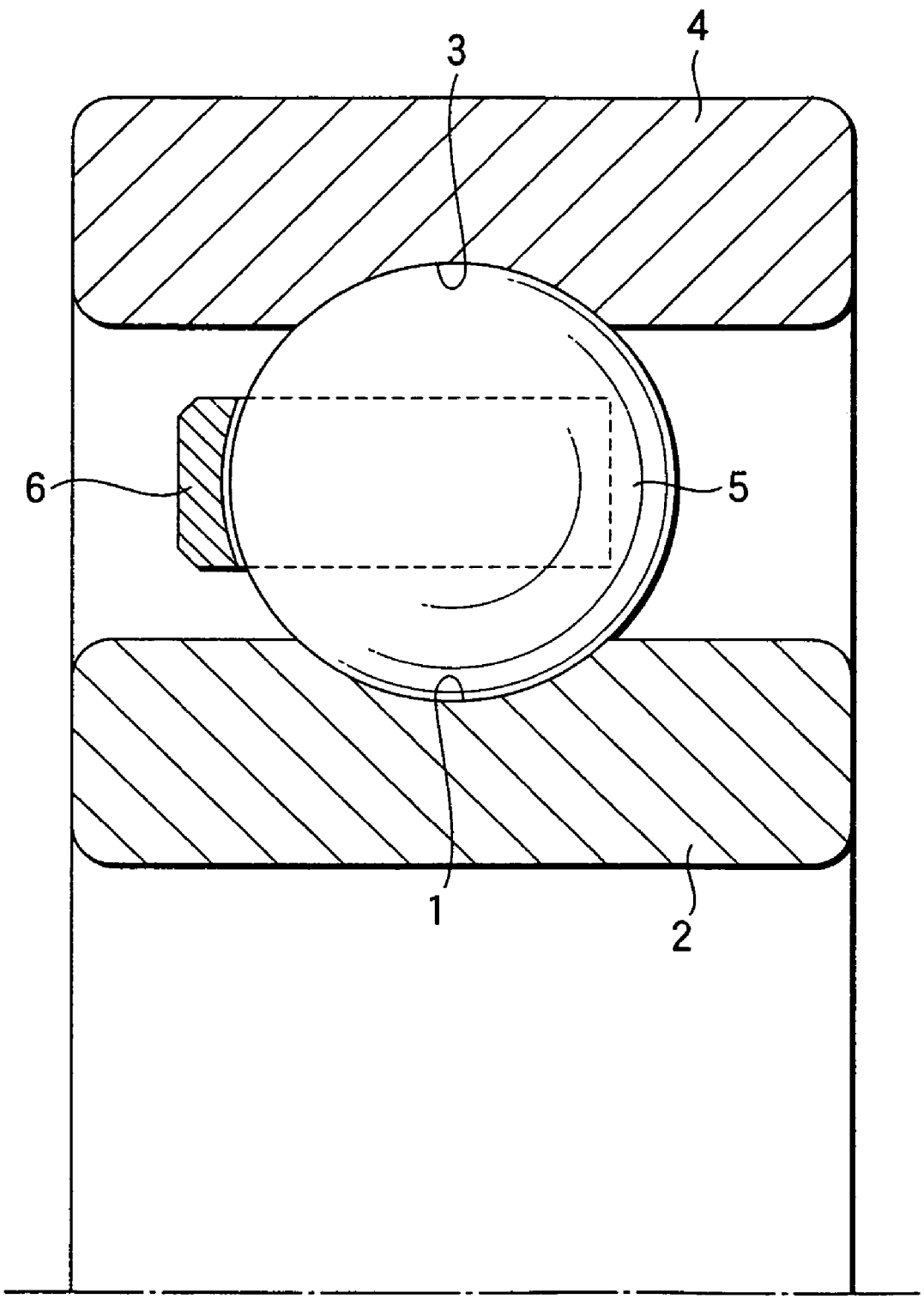
FIG. 2 is a semi-sectional view of a rolling bearing having a crown retainer mounted thereon.

Embodiments of implication of the present invention will be described hereinafter.

As the base resin constituting the resin composition to be used for the retainer of the invention there is used polyamide 46 (nylon 46: PA46), polyphenylene sulfide (PPS) or polyether ether ketone (PEEK) under the necessity of withstanding a temperature of at least 150° C. PA46 preferably comprises an elastomer component incorporated therein so that the resulting retainer can be more fairly assembled to bearing. As such an elastomer there is preferably used an ethylene propylene rubber. The amount of the elastomer to be incorporated is preferably from 2 to 10% by weight, particularly from 2 to 6% by weight from the standpoint of heat resistance and moldability. As the amount of the elastomer increases, the resin composition exhibits deteriorated heat resistance and moldability, although the resulting retainer can be more fairly assembled to bearing.

The foregoing base resin has glass fiber or carbon fiber dispersed therein as a reinforcing material in a predetermined amount under the necessity that it must have a flexural modulus of not smaller than 3,500 MPa at 180° C. and the resulting retainer must be fairly assembled to bearing. In some detail, PA46, if used as a base resin, comprises glass fiber incorporated therein in an amount of from not smaller than 20% by weight to less than 50% by weight, preferably from not smaller than 25% by weight to less than 40% by weight, or carbon fiber incorporated therein in an amount of from not smaller than 10% by weight to less than 40% by weight, preferably from not smaller than 15% by weight to less than 35% by weight. PPS, if used as a base resin, comprises carbon fiber incorporated therein in an amount of from not smaller than 20% by weight to less than 40% by weight, preferably from not smaller than 25% by weight to less than 35% by weight. PEEK, if used as a base resin, comprises glass fiber incorporated therein in an amount of from not smaller than 20% by weight to less than 40% by weight, preferably from not smaller than 25% by weight to less than 35% by weight, or carbon fiber incorporated therein in an amount of from not smaller than 10% by weight to less than 40% by weight, preferably from not smaller than 10% by weight to less than 35% by weight. When the content of glass fiber or carbon fiber in any of these resin compositions falls below the lower limit, the resulting resin composition can hardly be provided with a flexural modulus of 3,500 MPa at 180° C. as defined in the invention. On the contrary, when the content of glass fiber or carbon fiber exceeds the upper limit, the resulting resin composition can hardly be molded into a retainer. Further, the resulting retainer can be less fairly assembled to bearing.

The shape of glass fiber and carbon fiber is not specifically limited. In practice, however, glass fiber and carbon fiber each are preferably in the form of short fiber having a length of from 50 to 500 μm and a diameter of from 7 to 14 μm.

These resin compositions are commercially available. For example, as PA46 base there may be used Stanyl TW200F6 (containing glass fiber in an amount of 30% by weight; produced by DSM-JSR Engineering Plastics K.K.). As PPS base there may be used Fortron 2130A1 (containing carbon fiber in an amount of 30% by weight; produced by Polyplastics Co., Ltd.). As PEEK base there may be used 450GL30 (containing glass fiber in an amount of 30% by weight; produced by VICTREX CO., LTD.), 450CA30 (containing carbon fiber in an amount of 30% by weight; produced by VICTREX CO., LTD.) or the like.

The foregoing resin composition may comprise a heat stabilizer, a solid lubricant, a lubricant, a colorant, an antistat, a release agent, a fluidity improver, a crystallization accelerator or the like incorporated therein in a proper amount so far as the object of the invention cannot be impaired.

The foregoing resin composition has an excellent heat resistance and high temperature rigidity and a proper toughness such that the resulting retainer can be fairly assembled to bearing. In other words, the foregoing resin composition has a flexural modulus of at least 3,500 MPa at 180° C. and a heat-resistant temperature of at least 150° C.

Accordingly, the retainer made of such a resin composition, when used as a crown retainer for high temperature and high velocity ball bearing, exhibits both a proper toughness such that it can be properly deformed upon release during injection molding and can be fairly assembled to bearing and a high temperature rigidity such that it can be prevented from being deformed when operated at a high temperature and a high rotary speed.

The method and means for preparing the foregoing resin composition are not specifically limited. For example, various components may be separately supplied into a melt mixer. Alternatively, these components may be mixed by a mixer such as Henschel mixer and ribbon blender before being supplied into the melt mixer. As the melt mixer there may be used any device such as single screw extruder, twin-screw extruder, mixing roll, pressure kneader and Bradender Plastograph.

The method and means for preparing a retainer from the foregoing resin composition are not specifically limited. For example, the resin composition can be easily injection-molded into, e.g., crown retainer. However, when assembled into the bearing, the resulting retainer can easily undergo damage at welded portions at which molten resin parts have associated with each other during injection molding. Therefore, by using disc gate (or so-called film gate) as the gate for injection molding instead of ordinary tunnel gate, a retainer free of welded portion can be prepared to advantage. This disc gate comprises a thin film-like gate provided on the entire inner circumference of the retainer. After injection molding, this gate is cut off the retainer inside the mold. Alternatively, the retainer is withdrawn from the mold. The gate is then removed from the retainer by machining.

The retainer is preferably subjected to heat treatment to inhibit the heat deformation thereof. For example, the retainer which has been formed can be subjected to heat treatment at a temperature of 200° C. for about 4 hours to reduce the heat deformation thereof. This is because heat treatment causes the crystallinity of the base resin to be raised, enhancing the rigidity of the retainer.

The foregoing retainer can be assembled into the rolling bearing of the invention. Since the retainer has the foregoing properties, the rolling bearing of the invention can be used under severe working conditions such as high temperature, high rotary speed and high load over an extended period of time and thus is suitable for automobile alternator for example.

The present invention will be further described in the following examples and comparative examples, but the present invention should not be construed as being limited thereto.

EXAMPLES 1-12; COMPARATIVE EXAMPLES 1-6

(I) Preparation of Test Retainer

Test retainers were prepared from the following resin compositions.

(1) PA46 base: Stanyl TW200F6, produced DSM-JSR Engineering Plastics K.K.

(2) PPS base: Fortron 2130A1, produced by Polyplastics Co., Ltd.

(3) PPS base: Fortron KPS (containing 30 wt-% of GF), produced by Kureha Chemical Industry Co., Ltd.

(4) PA66 base: Ube Nylon 2020U (containing 30 wt-% of GF), produced by Ube Industries, Ltd.

(5) PEEK base: 450CA30, produced by VICTREX CO., LTD.

(6) PEEK base: 450GL30, produced by VICTREX CO., LTD.

GF stands for glass fiber.

Using an in-line screw type injection machine, these resin compositions were each then molded into a crown retainer having the shape shown in FIG. 1 (outer diameter: 47 mm; inner diameter: 17 mm) to prepare test retainers.

(II) Assembly Test of Retainer

In order to evaluate these test retainers for its capability of being assembled into bearing, rolling elements were mounted in these test retainers using an air-driven automatic ball mounting machine having the structure shown in FIG. 3 produced by JAPAN STEEL WORKS, LTD.

As shown in FIGS. 3a and 3b, the air-driven automatic ball mounting machine presses a pressure plate 18 fixed to a pneumatically-driven cylinder rod 17 against balls equally distributed into pockets of a retainer 11 to mount momentarily all the balls into the pockets.

As shown in FIG. 3b, a frame 14 and a retainer support 15 were fixed onto a substrate 13. A retainer 11 having balls 12 equally distributed thereon is then placed on the retainer support 15. A pressure plate 18 fixed to a cylinder rod 17 which moves downward and upward from a pneumatic cylinder 16 fixed to the frame 14 is then allowed to move toward the retainer support 15 (downward) to press the balls 12 so that all the balls are mounted into the pockets of the retainer 11. During this process, the moving velocity of the cylinder rod 17 was 0.2 m/sec, the load was 147 N (15 kgf), and the ambient temperature was 20° C.

For the evaluation of capability of being assembled into bearing, it was judged to see if the nail of the retainer 11 is broken during the foregoing operation. When such a phenomenon was not observed to occur, the test retainer was judged to have a good capability of being assembled into bearing. Such a test retainer is marked with G (good) in Table 1. On the contrary, when such a phenomenon was observed to occur, the test retainer was judged to have a poor capability of being assembled into bearing. Such a test retainer is marked with P (poor) in Table 1. The retainers of Example 1 and Comparative Example 1 were each allowed to contain a water content of from 1.5 to 2% before being assembled into bearing.

TABLE 1

| | | Resin composition and reinforcing material (wt-%) | | |
|---|---|---|---|---|
| Sample No. | Kind of resin | Glass fiber | Carbon fiber | Capability of being assembled into bearing |
| Example 1 | PA46 70 | 30 | | G |
| Example 2 | PPS 70 | | 30 | G |
| Example 3 | PEEK 70 | 30 | | G |
| Example 4 | PEEK 70 | | 30 | G |
| Comparative Example 1 | PA66 70 | 30 | | G |
| Comparative Example 2 | PPS 70 | 30 | | G |

As can be seen in Table 1, all the retainers of Examples 1 to 4 and Comparative Examples 1 and 2 were not observed to undergo damage and thus were judged to have a good capability of being assembled into bearing.

(III) Flexural Test

Using an injection molding machine, the various resin compositions were each formed into a flexural test specimen having a length of 80 mm, a width of 10 mm and a thickness of 4 mm. These test specimens were each then subjected to flexural test using an autograph produced by Shimazdu Corp. In some detail, the test specimen was allowed to stand in a constant temperature tank (180° C.) mounted in the autograph for 30 minutes. When the temperature of the test specimen was raised to 180° C., the test specimen was then subjected to flexural test according to JIS K 7171 to determine its flexural modulus of elasticity. The results are set forth in Table 2.

(IV) Rotary Test on Bearing

In order to evaluate the high temperature and high rotary speed properties of bearing, the same retainer as used in the assembly test of retainer was prepared. The retainer was then assembled into a ball bearing for high temperature and high speed alternator (Model No. 6203). A grease (urea ester oil-based grease) was then enclosed in the bearing in an amount of 1.0 g. The bearing was then sealed to complete a test bearing. As a rotary testing machine there was used a high temperature and high speed rotary testing machine produced by JAPAN STEEL WORKS, LTD. Referring to the test conditions, the bearing temperature was 180° C., the rotary speed was 18,000 rpm or 22,000 rpm, the test load was 2,450 N (250 kgf), and the testing time was 50 hours.

Figure 4A:
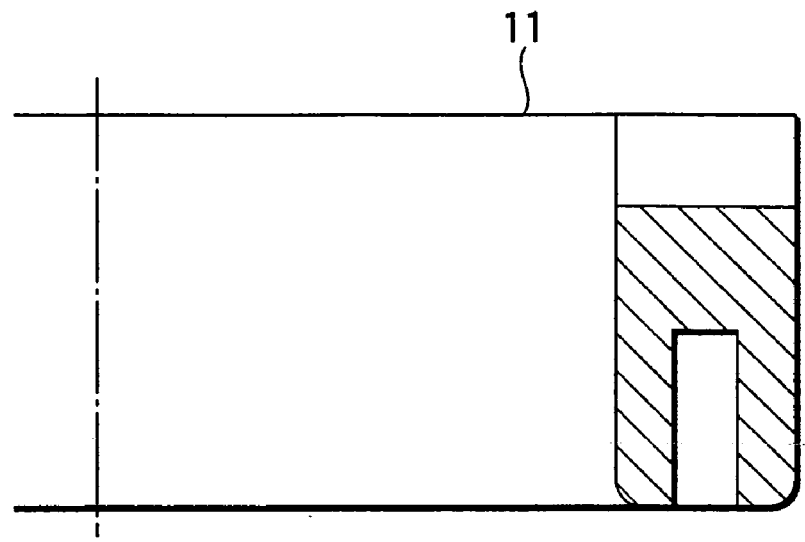
FIG. 4 is a sectional view illustrating the deformation of a crown retainer.
Figure 4B:
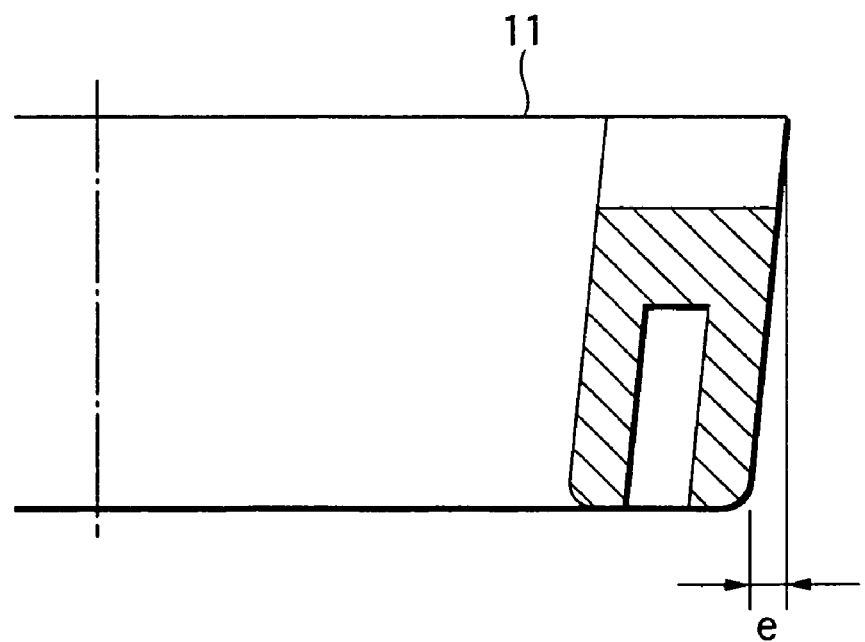

For the evaluation of high temperature and high rotary speed properties, the retainer which had been subjected to rotary test was examined for deformation e (see FIG. 4), abrasion, damage, etc. In some detail, those having a deformation e of not greater than 0.15 mm and showing no abnormal abrasion and damage were acceptable. FIG. 4a indicates an untested retainer the nail of which is not yet deformed. FIG. 4b indicates the deformation of the nail of the retainer thus tested. The deformation is represented by the value e. The deformation e of the retainer was measured by a toolmakers' microscope. The results are set forth in Table 2.

TABLE 2

| Sample No. | Resin composition and reinforcing material (wt-%) | | | flexural modulus of elasticity (MPa) at 180° C. | Deformation (mm) at 18,000 rpm | Deformation (mm) at 22,000 rpm |
|---|---|---|---|---|---|---|
| | Kind of resin | Glass fiber | Carbon fiber | | | |
| Example 5 | PA46 70 | 30 | | 4,300 | 0.04 | 0.06 |
| Example 6 | PPS 70 | | 30 | 5,100 | 0.06 | 0.08 |
| Example 7 | PEEK 70 | 30 | | 3,800 | 0.06 | 0.09 |
| Example 8 | PEEK 70 | | 30 | 11,000 | 0 | 0.02 |
| Comparative Example 3 | PA66 70 | 30 | | 3,200 | 0.15 | 0.19 |
| Comparative Example 4 | PPS 70 | 30 | | 1,800 | 0.18 | 0.22 |

As can be seen in Table 2, all the test specimens of Examples 5 to 8 exhibit a flexural elasticity modulus of greater than 3,500 MPa at 180° C. In the evaluation of rotary properties, the retainers of Comparative Examples 3 and 4 showed a great deformation and thus were judged unacceptable. The retainer of Comparative Example 4 showed marks developed by contact with the outer ring on the periphery thereof. None of the retainers of Examples 5 to 8 and Comparative Examples 3 and 4 showed abnormal abrasion and damage.

The ambient temperature of the testing machine was raised to 200° C. where these test specimens were then subjected to the foregoing tests (3) and (4). The results of evaluation of continuous rotary properties at 18,000 rpm and 22,000 rpm and flexural modulus of elasticity at 180° C. are set forth in Table 3.

at 200° C. but exhibits a flexural elasticity modulus of greater than 3,500 MPa at 180° C., demonstrating that it satisfies the requirements defined in the invention. All the retainers of Examples 9 to 12 exhibit a deformation of not greater than 0.15 mm at the evaluation test at 18,000 rpm and 22,000 rpm to advantage. On the contrary, the test specimens of Comparative Examples 5 and 6 showed a great deformation and were observed to have abrasion in the pockets and marks developed by contact with the outer ring at 22,000 rpm.

Figure 6:
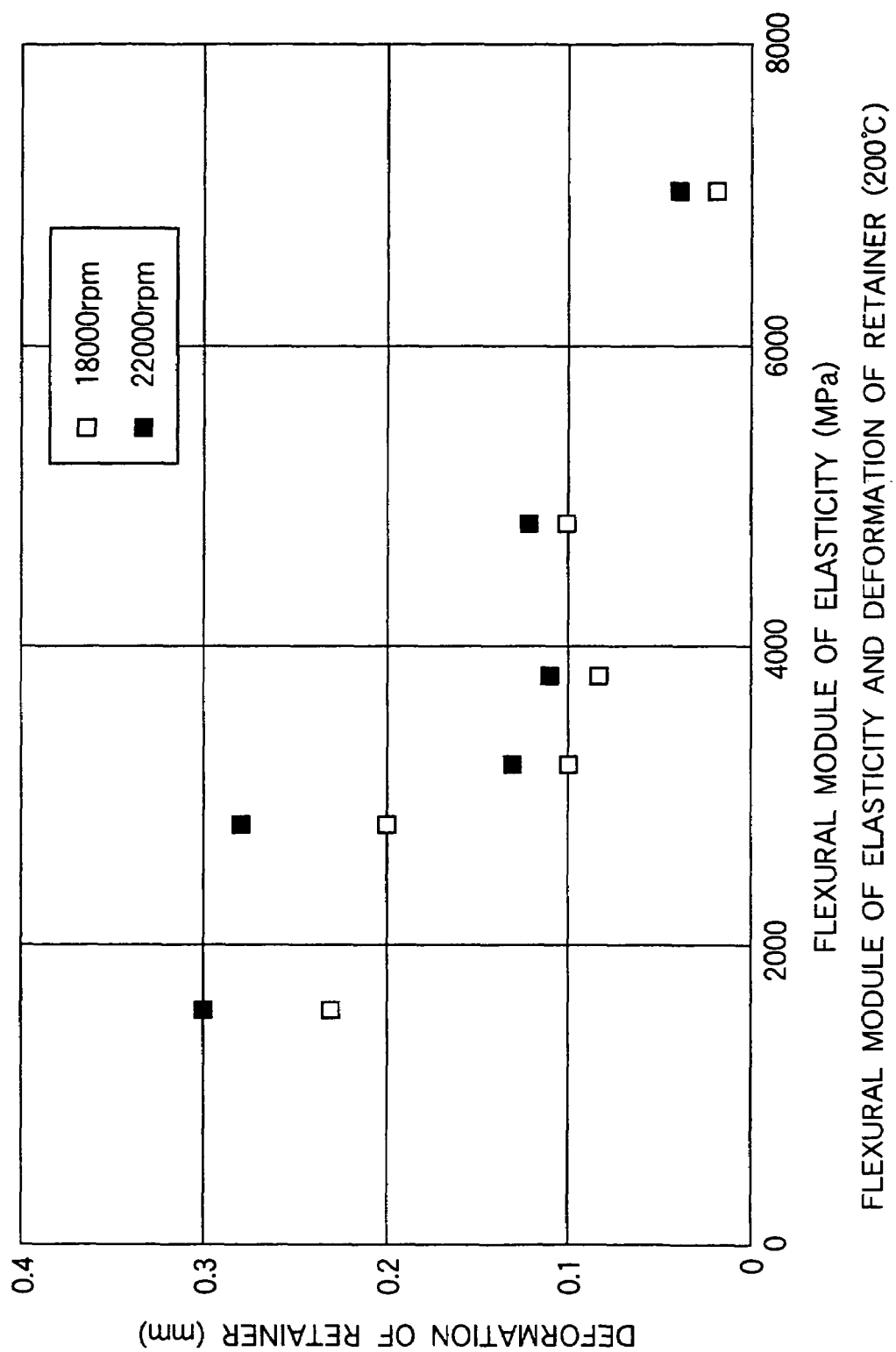
FIG. 6 is a graph illustrating the relationship between the deformation and flexural modulus of elasticity of a retainer on bearing rotary test at 200° C.

The results of relationship between flexural modulus of elasticity and deformation are collectively set forth in FIGS. 5 and 6. These results show that capability of being assembled into bearing, heat resistance and high temperature rigidity are important for bearing retainer for high temperature and high speed alternator and the retainer needs to have a flexural elasticity modulus of not smaller than 3,500 MPa at 180° C.

(V) Heat Resistance Test

In order to evaluate the environmental durability of these test retainers, these test retainers were subjected to heat deterioration test. In some detail, the formulations set forth in Table 1 were used to prepare crown retainers (Examples 1 to 4 and Comparative Examples 1 and 2) having the same size and shape as in the foregoing ball mounting test. For the heat deterioration test, the retainers were each allowed to stand in a 170° C. constant temperature tank with internal air circulation for predetermined periods of time up to 1,000 hours.

TABLE 3

| Sample No. | Resin composition and reinforcing material (wt-%) | | | flexural modulus of elasticity (MPa) at 200° C. | Deformation (mm) at 18,000 rpm | Deformation (mm) at 22,000 rpm |
|---|---|---|---|---|---|---|
| | Kind of resin | Glass fiber | Carbon fiber | | | |
| Example 9 | PA46 70 | 30 | | 3,800 | 0.08 | 0.11 |
| Example 10 | PPS 70 | | 30 | 4,800 | 0.11 | 0.14 |
| Example 11 | PEEK 70 | 30 | | 3,200 | 0.10 | 0.13 |
| Example 12 | PEEK 70 | | 30 | 7,000 | 0.02 | 0.04 |
| Comparative Example 5 | PA66 70 | 30 | | — | 0.20 | 0.28 |
| Comparative Example 6 | PPS 70 | 30 | | 1,600 | 0.23 | 0.30 |

Figure 7:
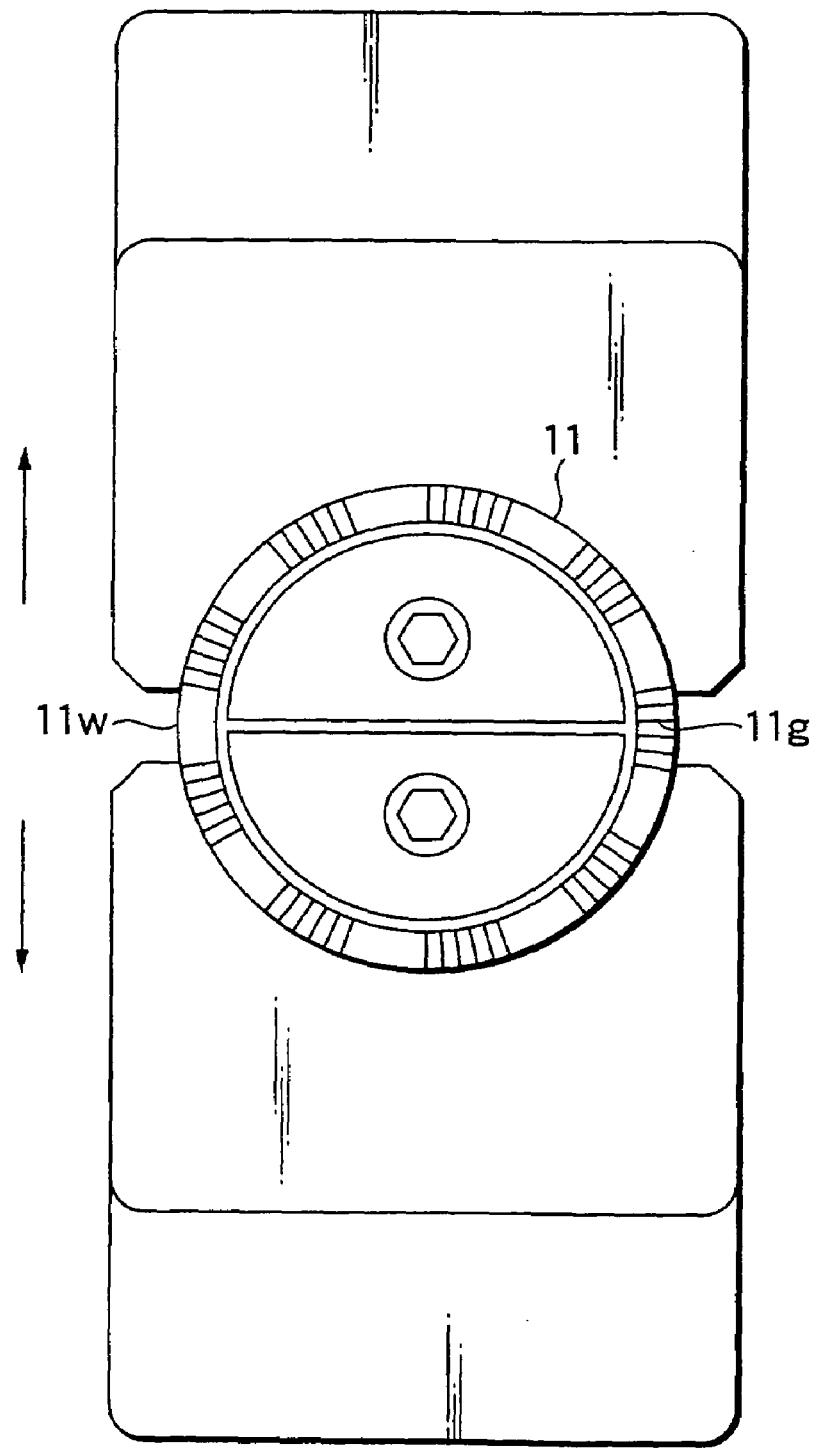
FIG. 7 is a diagram illustrating the tensile strength test on retainer using a circular tensile testing fixture.

As can be seen in Table 3, the test specimens of Examples 9, 10 and 12 exhibit a flexural elasticity modulus of greater than 3,500 MPa at 200° C. The test specimen of Example 11 exhibits a flexural elasticity modulus of less than 3,500 MPa The retainers thus tested were each then subjected to circular tensile test. For the circular tensile test, a test retailer 11 was fixed to a circular tensile fixture shown in FIG. 7 in such an arrangement that the gate 11g and the weld 11W were in horizontal position. Using a tensile testing machine (Type AG-10KNG autograph, produced by Shimazdu Corp.), the test retainer 11 was then subjected to circular tensile test at a tensile rate of 10 mm/min. The tensile break load was then measured. Then, the percent strength retention was determined with that of the untreated test specimen as 100%. The results are shown in FIG. 8.

Figure 8:
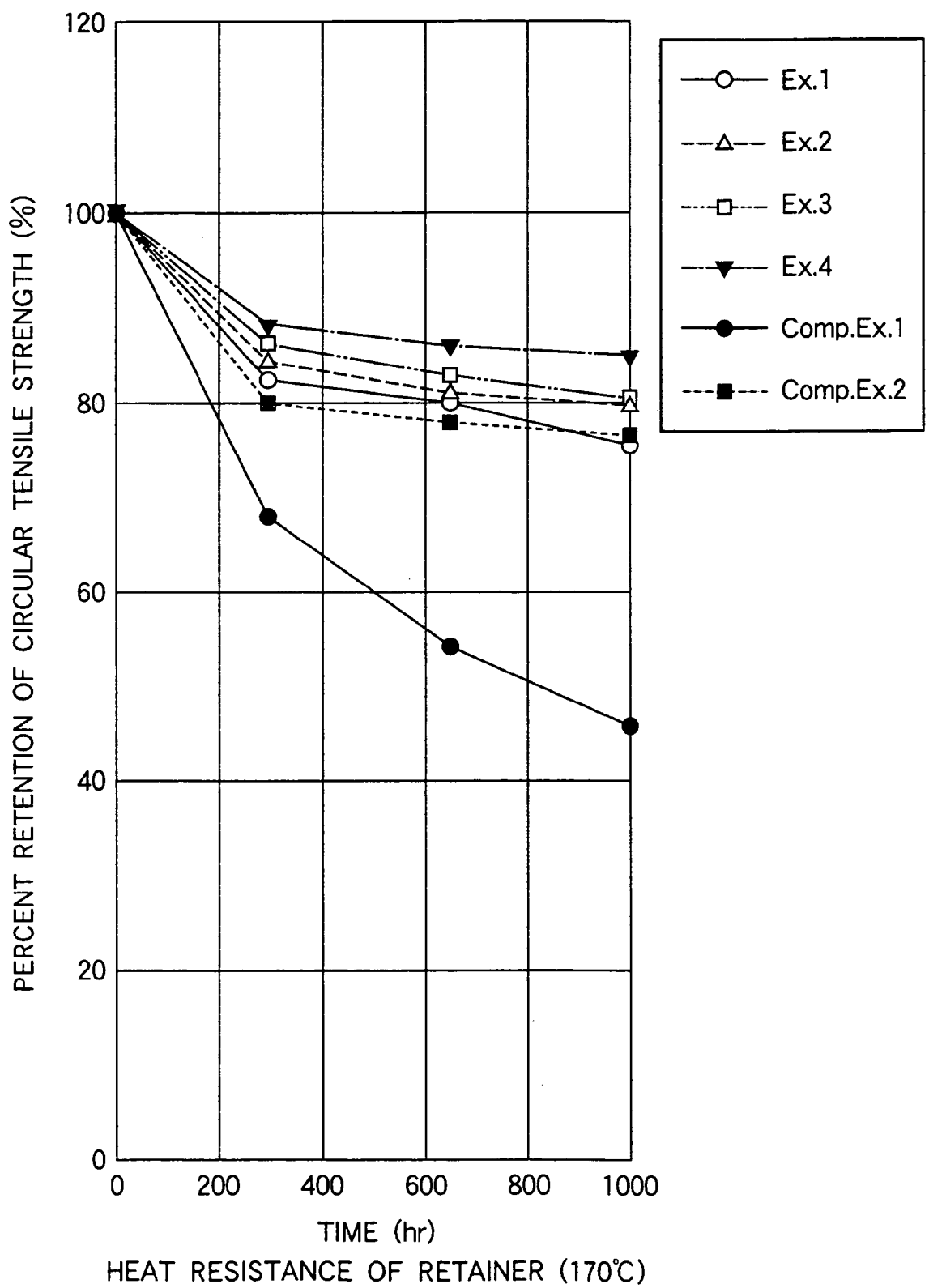
FIG. 8 is a graph illustrating by percent retention of circular tensile strength the change of strength with time during heat resistance test on retainer.

As can be seen in FIG. 8, the test specimens of Examples 1 to 4 and Comparative Example 2 undergo little heat deterioration and retains not smaller than 75% of the initial strength even after 1,000 hours of aging. On the contrary, the retainer made of PA66 as a base resin of Comparative Example 1 is deteriorating.

Figure 9:
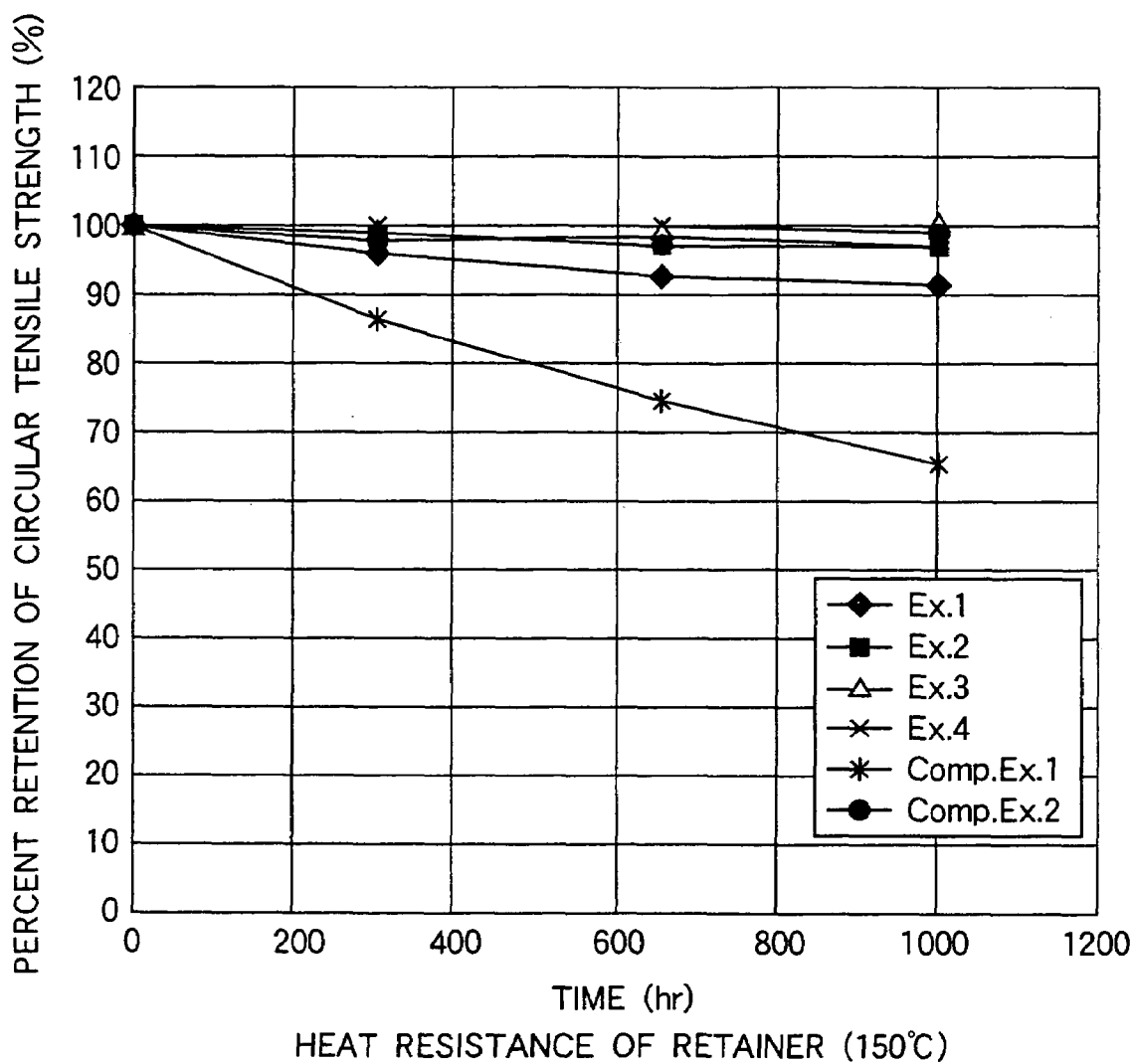
FIG. 9 is a graph illustrating the results of heat resistance test at 150° C.

The same evaluation was made at a temperature of 150° C. The results are shown in FIG. 9. As can be seen in these results, the retainer made of PA66 as a base resin has a deteriorated heat resistance on the supposition that the heat-resistant temperature of at least 150° C. as defined in the invention must be satisfied. This demonstrates that as a base resin there should be used PA46, PPS or PEEK.

EXAMPLES 13-25; COMPARATIVE EXAMPLES 7-14

(VI) Preparation of Test Retainer

Resins free of fiber (hereinafter referred to as "neat resin") as shown in Table 4 were each put into a twin-screw melting extruder. A predetermined amount of fiber was then put into the extruder at substantially central part where the resin was melted to prepare resin compositions. In order to prepare these neat resins, Stanyl (produced by DSM-JSR Engineering Plastics K.K.) as PA46, Fortron (produced by Polyplastics Co., Ltd.) as PPS, and a neat resin produced by VICTREX CO., LTD. as PEEK were kneaded at a melt temperature of 310° C., 305° C. and 370° C., respectively. PA46 used comprised an ethylenepropylene rubber incorporated therein in an amount of 3% by weight.

Subsequently, the resin compositions were melt-kneaded, and then formed into pellets to be injection-molded. The resin composition comprising 50 wt % of glass fiber incorporated in PEEK (Comparative Example 13) and the resin composition comprising 50 wt % of carbon fiber incorporated in PEEK (Comparative Example 14) exhibited a poor fluidity and thus were not able to give pellets which can be molded.

TABLE 4

|  | Neat resin | Glass fiber | Carbon fiber | Pelletizability |
|---|---|---|---|---|
| Comparative Example 7 | PA46 | 10 wt-% |  | Good |
| Example 13 | PA46 | 20 wt-% |  | Good |
| Example 14 | PA46 | 40 wt-% |  | Good |
| Comparative Example 8 | PA46 | 50 wt-% |  | Good |
| Example 15 | PA46 |  | 10 wt-% | Good |
| Example 16 | PA46 |  | 20 wt-% | Good |
| Example 17 | PA46 |  | 30 wt-% | Good |
| Example 18 | PA46 |  | 40 wt-% | Good |
| Comparative Example 9 | PA46 |  | 50 wt-% | Good |
| Comparative Example 10 | PPS | 10 wt-% |  | Good |
| Example 19 | PPS | 20 wt-% |  | Good |
| Example 20 | PPS | 35 wt-% |  | Good |
| Comparative Example 11 | PPS | 40 wt-% |  | Good |
| Comparative Example 12 | PEEK | 10 wt-% |  | Good |

TABLE 4-continued

|  | Neat resin | Glass fiber | Carbon fiber | Pelletizability |
|---|---|---|---|---|
| Example 21 | PEEK | 20 wt-% |  | Good |
| Example 22 | PEEK | 40 wt-% |  | Good |
| Comparative Example 13 | PEEK | 50 wt-% |  | Poor |
| Example 23 | PEEK |  | 10 wt-% | Good |
| Example 24 | PEEK |  | 20 wt-% | Good |
| Example 25 | PEEK |  | 40 wt-% | Good |
| Comparative Example 14 | PEEK |  | 50 wt-% | Poor |

These pelletized materials were each put into an in-line screw type injection molding machine to form a crown retainer having the shape shown in FIG. 1 (outer diameter: 47 mm; inner diameter: 17 mm). Thus, test retainers were prepared.

(VII) Assembly Test of Retainer

The various test retainers were each then evaluated for capability of being assembled into bearing in the same manner as in the test method (2). The results are set forth in Table 5. As can be seen in Table 5, all the retainers of the present examples exhibit an excellent capability of being assembled into bearing.

(VIII) Rotary Test on Bearing

The various test retainers were each subjected to rotary test in the same manner as in the test method (4) except that the ambient temperature was 180° C. and the rotary speed was 18,000 rpm. The results are set forth in Table 5. The results show that all the test retainers of the present examples show a deformation of not greater than 0.15 mm to advantage.

The test retainers of Examples 13, 15 and 19 showed an initial deformation as much as 0.16 mm (Example 13), 0.17 mm (Example 15) and 0.16 mm (Example 19), respectively. However, when subjected to heat treatment at a temperature of 200° C. in an oven for 4 hours, these test retainers showed a deformation as small as 0.09 mm (Example 13), 0.08 mm (Example 15) and 0.08 mm (Example 19), respectively, to advantage. Using a differential scanning calorimeter, PA46 and PPS were compared with each other in change of endotherm (heat of fusion of crystal) from before to after heat treatment. As a result, PA46 and PPS were found to have a 10% and 13% rise of endotherm, respectively. This is presumably attributed to the rise of crystallinity of resin.

TABLE 5

|  | Capability of being assembled to bearing | Deformation of retainer at high temperature |
|---|---|---|
| Comparative Example 7 | Good | Poor |
| Example 13 | Good | Good (heat-treated) |
| Example 14 | Good | Good |
| Comparative Example 8 | Poor | Poor |
| Example 15 | Good | Good (heat-treated) |
| Example 16 | Good | Good |
| Example 17 | Good | Good |
| Example 18 | Good | Good |
| Comparative Example 9 | Poor | Poor |
| Comparative Example 10 | Good | Poor |

TABLE 5-continued

| | Capability of being assembled to bearing | Deformation of retainer at high temperature |
|---|---|---|
| Example 19 | Good | Good (heat-treated) |
| Example 20 | Good | Good |
| Comparative Example 11 | Poor | Poor |
| Comparative Example 12 | Good | Poor |
| Example 21 | Good | Good |
| Example 22 | Good | Good |
| Comparative Example 13 | Not tested | Not tested |
| Example 23 | Good | Good |
| Example 24 | Good | Good |
| Example 25 | Good | Good |
| Comparative Example 14 | Not tested | Not tested |

(IX) Flexural Test

Figure 10:
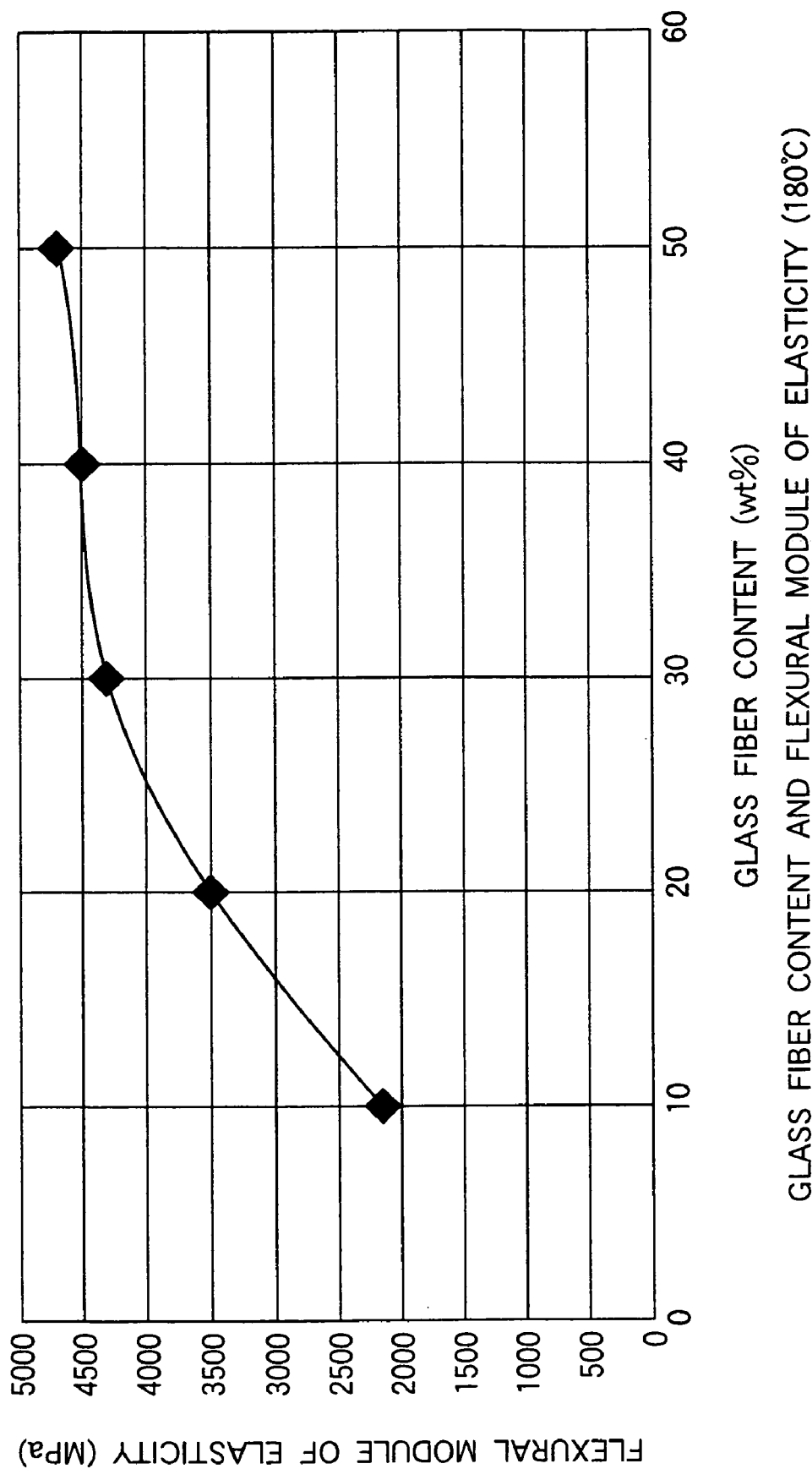
FIG. 10 is a graph illustrating the relationship between the glass fiber content and the flexural modulus of elasticity of glass fiber-containing PA46.
Figure 11:
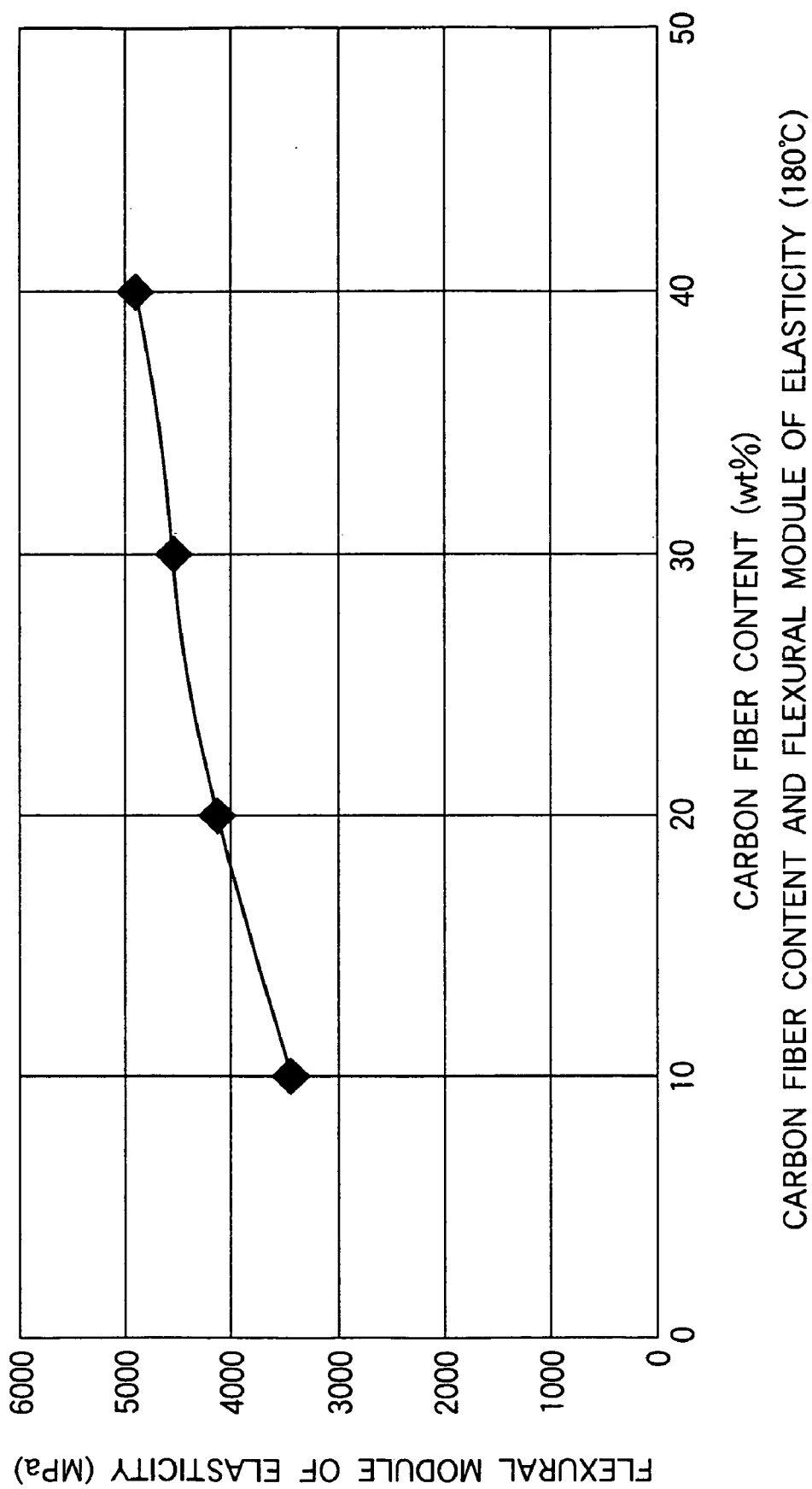
FIG. 11 is a graph illustrating the relationship between the carbon fiber content and the flexural modulus of elasticity of carbon fiber-containing PA46.
Figure 12:
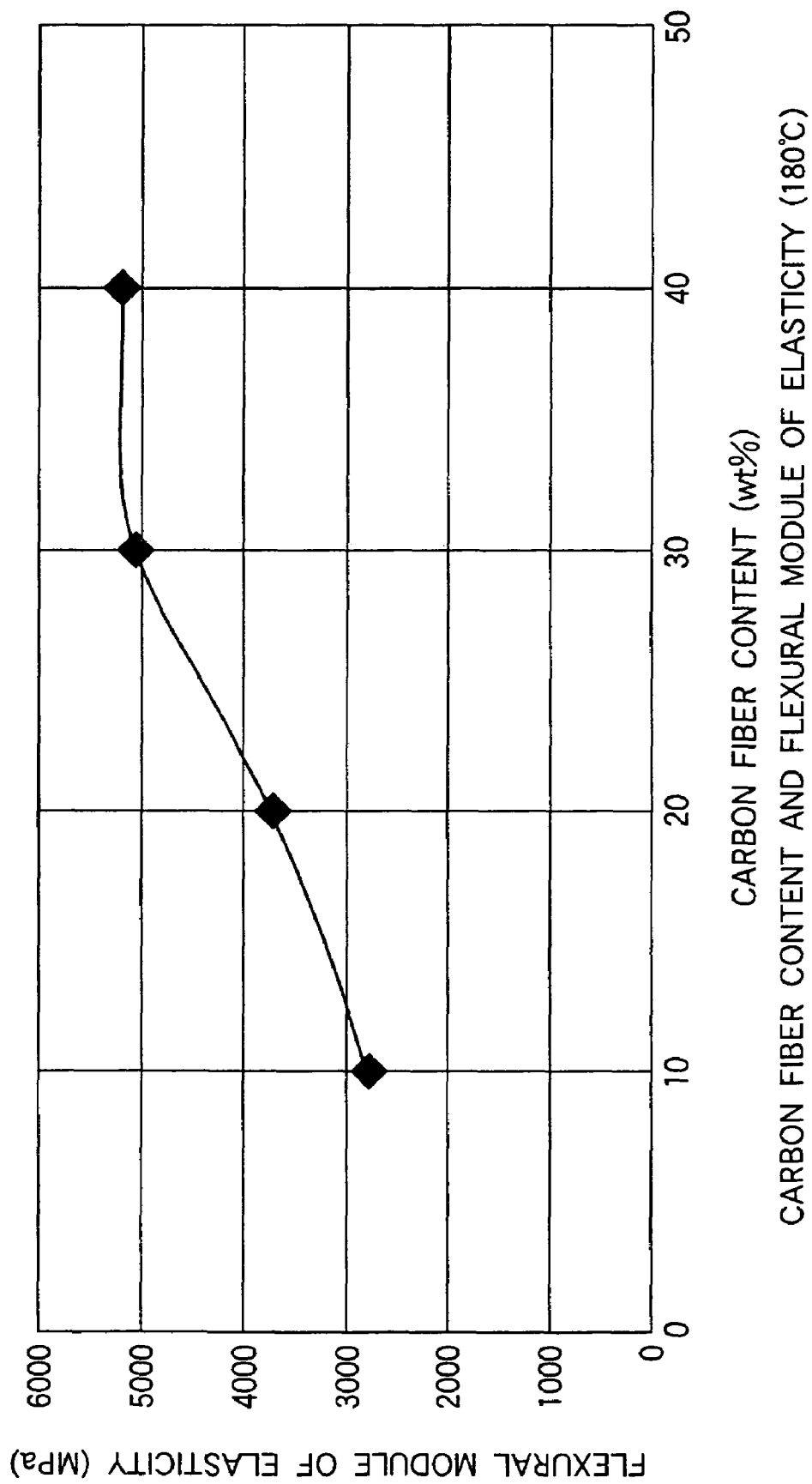
FIG. 12 is a graph illustrating the relationship between the carbon fiber content and the flexural modulus of elasticity of carbon fiber-containing PPS.
Figure 13:
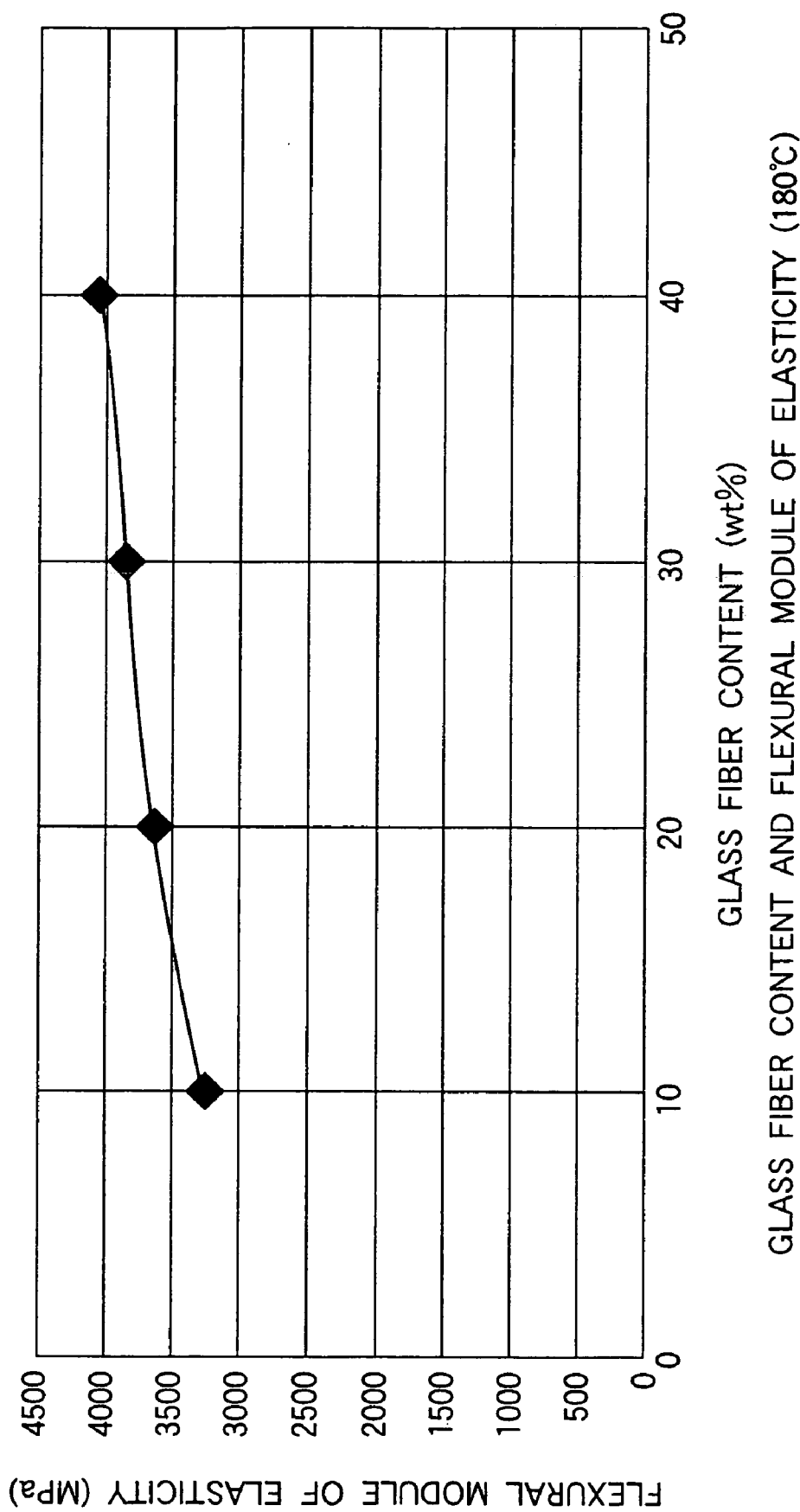
FIG. 13 is a graph illustrating the relationship between the glass fiber content and the flexural modulus of elasticity of glass fiber-containing PEEK.
Figure 14:
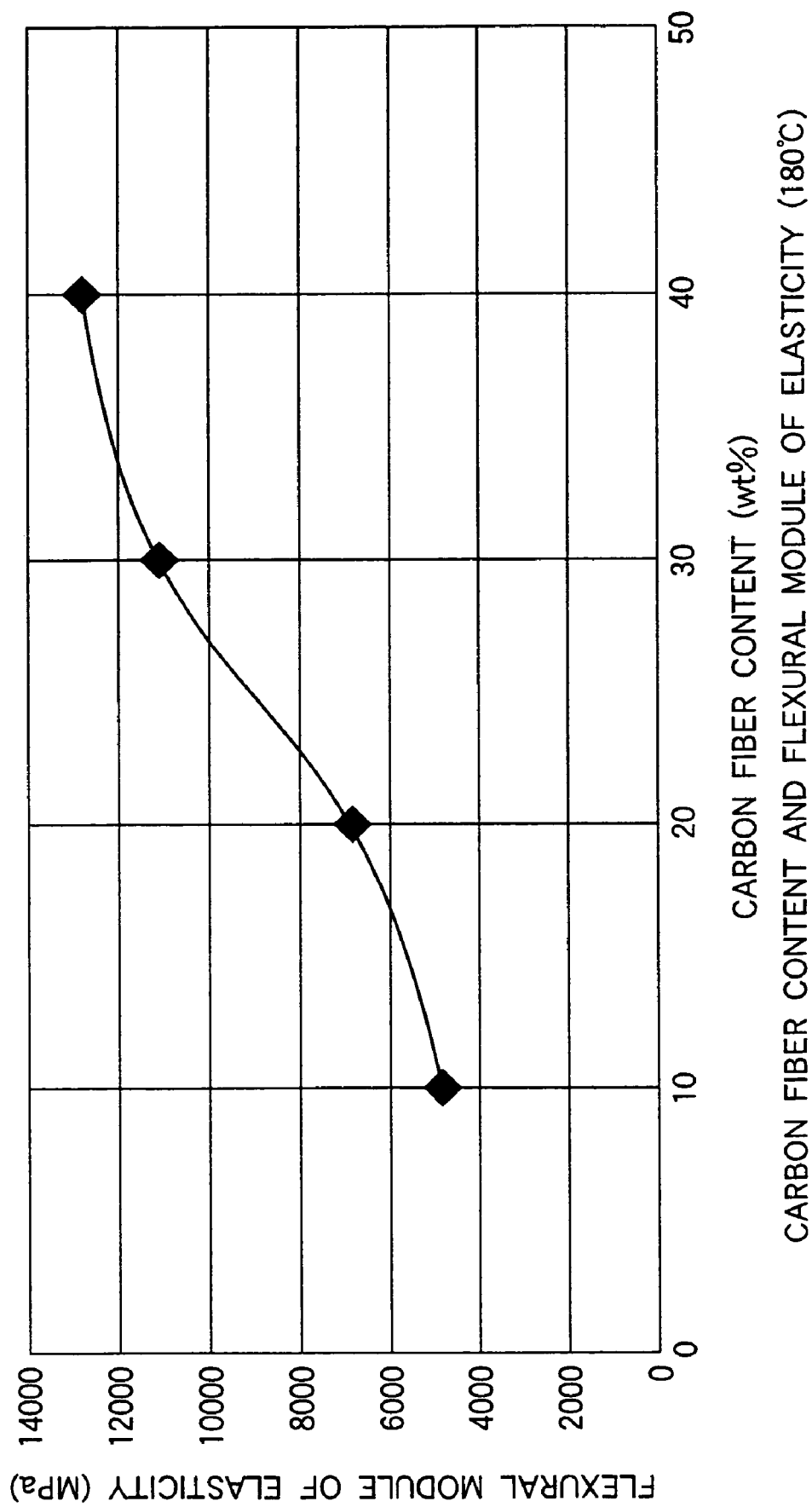
FIG. 14 is a graph illustrating the relationship between the carbon fiber content and the flexural modulus of elasticity of carbon fiber-containing PEEK, wherein the reference numeral 1 indicates a raceway on inner ring, the reference numeral 2 indicates an inner ring, the reference numeral 3 indicates a raceway on outer ring, the reference numeral 4 indicates an outer ring, the reference numerals 5 and 12 each indicate a rolling element, and the reference numerals 6 and 11 each indicate a crown retainer for ball bearing.

The various neat resins were each melt-kneaded with reinforcing materials in various amounts to prepare pellets which were then injection-molded into flexural test specimens having a length of 80 mm, a width of 10 mm and a thickness of 4 mm. These test specimens were each then subjected to flexural test at 180° C. in the same manner as in the test method (3) to determine its flexural modulus of elasticity. FIG. 10 indicates the results of test on test specimens made of resin compositions of PA46 base having different glass fiber contents, FIG. 11 indicates the results of test on test specimens made of resin compositions of PA46 base having different carbon fiber contents, FIG. 12 indicates the results of test on test specimens made of resin compositions of PPS base having different carbon fiber contents, FIG. 13 indicates the results of test on test specimens made of resin compositions of PEEK base having different carbon fiber contents, and FIG. 14 indicates the results of test on test specimens made of resin compositions of PEEK base having different carbon fiber contents. These results show that the mechanical requirements of the invention, i.e., flexural elasticity modulus of not smaller than 3,500 MPa at 180° C. can be satisfied when PA46 has a glass fiber content of not smaller than 20% by weight or a carbon fiber content of not smaller than 10% by weight (see FIGS. 10 and 11), PPS has a carbon fiber content of not smaller than 20% by weight (see FIG. 12) and PEEK has a glass fiber content of not smaller than 20% by weight or a carbon fiber content of not smaller than 10% by weight (see FIGS. 13 and 14).

(X) Evaluation of Molding System 300 samples of the retainer of PPS base having a carbon fiber content of 35% of Example 20 were prepared each by tunnel gate process and disc gate process. These samples were each then evaluated for capability of being assembled into bearing in the same manner as in the test method (2). As a result, the samples prepared by tunnel gate process showed slight crack at a ratio of 1 per 100 samples while those by disc gate process all remained normal. Further, the samples prepared by disc gate process showed a roundness of about half that of those by tunnel gate process and hence a high dimensional precision.

While the foregoing examples showed good results when evaluated for rotary durability in the form of bearing for high temperature and high speed alternator which is required to operate at a temperature as high as 180° C. to 200° C. and a rotary speed as high as 18,000 to 22,000 rpm, it is apparent from the results of the foregoing examples that the retainer according to the invention exhibits sufficient properties also as retainer for other high temperature and high speed rotary bearings.

The present invention has been described hereinabove mainly with reference to ball bearing provided with crown retainer. However, the present invention is not limited to this type of retainers but can be applied to various rolling bearings provided with other retainers such as those for tapered roller bearing, spherical roller bearing, cylindrical roller bearing, general ball bearing, angular contact ball bearing, needle bearing and roller clutch.

The rolling bearing according to the invention comprises a retainer made of a resin composition having a heat-resistant temperature of at least 150° C. and a flexural elasticity modulus of not smaller than 3,500 MPa at 180° C. Since the retainer has a proper toughness such that it can be fairly assembled into bearing and excellent mechanical properties, the rolling bearing according to the invention can be used under severe working conditions such as high temperature, high rotary speed and high load over an extended period of time.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising:
inner and outer members rotatable relative to each other;
a plurality of rolling elements rotatably interposed between said inner and outer members; and
a retainer rotatably holding said rolling elements, wherein said retainer is made of a resin composition having a flexural modulus of at least 3,500 MPa at 180° C. and a heat-resistant temperature of at least 150° C., wherein said resin composition is a polyamide 46 containing glass fiber in an amount of from not smaller than 30% by weight to less than 50% by weight, and
wherein a tensile strength drop of the resin composition after 1,000 hours elapsed at the temperature of 150° C. is within 10%., wherein
said resin composition consists essentially of two components.

2. A rolling bearing comprising:
inner and outer members rotatable relative to each other;
a plurality of rolling elements rotatably interposed between said inner and outer members; and
a retainer rotatably holding said rolling elements, wherein said retainer is made of a resin composition having a flexural modulus of at least 3,500 MPa at 180° C. and a heat-resistant temperature of at least 150° C., wherein said resin composition is polyamide 46 containing carbon fiber in an amount of from not smaller than 10% by weight to less than 40% by weight, and
wherein a tensile strength drop of the resin composition after 1,000 hours elapsed at the temperature of 150° C. is within 10%,
wherein said resin composition consists essentially of two components,
wherein the resin composition has the flexural modulus of 4100 to 4800 at 180° C.

* * * * *